United States Patent
Zipperer et al.

(10) Patent No.: US 9,774,611 B1
(45) Date of Patent: Sep. 26, 2017

(54) DYNAMICALLY DEPLOYING A NETWORK TRAFFIC FILTER

(71) Applicant: Amazon Technologies, Inc., Reno, NV (US)

(72) Inventors: Joseph Paul Zipperer, Seattle, WA (US); Andrew Bruce Dickinson, Seattle, WA (US); Kirk Arlo Petersen, Nevada City, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/204,864

(22) Filed: Mar. 11, 2014

(51) Int. Cl.
- H04L 29/06 (2006.01)
- G06F 21/55 (2013.01)
- G06F 21/57 (2013.01)

(52) U.S. Cl.
CPC ........ *H04L 63/1408* (2013.01); *G06F 21/552* (2013.01); *H04L 63/0236* (2013.01); *H04L 63/1441* (2013.01); *H04L 63/1458* (2013.01); *G06F 21/57* (2013.01); *H04L 63/0227* (2013.01); *H04L 2463/141* (2013.01)

(58) Field of Classification Search
CPC ............. H04L 63/1458; H04L 63/0227; H04L 63/1441; H04L 2463/141; H04L 63/0236; G06F 21/552; G06F 21/57
See application file for complete search history.

(56) References Cited

U.S. PATENT DOCUMENTS

| | | | |
|---|---|---|---|
| 7,028,179 B2 * | 4/2006 | Anderson | H04L 63/0227 709/224 |
| 7,331,060 B1 * | 2/2008 | Ricciulli | H04L 63/1458 709/227 |
| 7,620,986 B1 * | 11/2009 | Jagannathan | H04L 63/1425 713/150 |
| 7,801,128 B2 | 9/2010 | Hoole et al. | |
| 7,836,498 B2 * | 11/2010 | Poletto | H04L 12/2602 726/22 |
| 8,726,379 B1 * | 5/2014 | Stiansen | H04L 63/1491 726/22 |
| 9,282,113 B2 * | 3/2016 | Vaughan | H04L 63/1441 |
| 2002/0174208 A1 * | 11/2002 | Morlitz | H04L 29/06 709/223 |
| 2003/0014665 A1 * | 1/2003 | Anderson | H04L 63/0227 726/4 |
| 2004/0114519 A1 * | 6/2004 | MacIsaac | H04L 12/2602 370/232 |

(Continued)

OTHER PUBLICATIONS

Implementing Pushback: Router-Based Defense Against DDoS Attacks; John Ioannidis et al.; 2002.*

(Continued)

*Primary Examiner* — James Turchen
(74) *Attorney, Agent, or Firm* — Lee & Hayes, PLLC

(57) ABSTRACT

Functionality is disclosed herein for dynamically deploying an upstream network traffic filter in a network. The upstream network filter is dynamically deployed in a location that is closer to an entry point of an attack such that attack traffic reaches the upstream network filter before reaching a network traffic filter that is configured to perform network traffic filtering for a computing resource that is under attack. The upstream network traffic filter includes rules that are based on at least a portion of the rules that are applied by the network traffic filter.

18 Claims, 9 Drawing Sheets

(56) References Cited

U.S. PATENT DOCUMENTS

| | | | |
|---|---|---|---|
| 2004/0199576 A1* | 10/2004 | Tan | H04L 12/2602 709/203 |
| 2005/0060573 A1* | 3/2005 | D'Souza | H04L 63/1458 726/4 |
| 2006/0137009 A1* | 6/2006 | Chesla | G06F 21/552 726/22 |
| 2007/0064610 A1* | 3/2007 | Khandani | H04L 47/10 370/235 |
| 2008/0086772 A1* | 4/2008 | Chesla | H04L 63/145 726/23 |
| 2008/0101229 A1* | 5/2008 | Meleis | H04L 43/16 370/233 |
| 2008/0127324 A1* | 5/2008 | Seo | H04L 63/1458 726/13 |
| 2009/0150564 A1* | 6/2009 | Anbalagan | H04L 47/10 709/241 |
| 2009/0288163 A1* | 11/2009 | Jacobson | G06F 15/173 726/22 |
| 2010/0189110 A1* | 7/2010 | Kambhampati | H04L 45/00 370/400 |
| 2011/0075667 A1* | 3/2011 | Li | H04L 12/4633 370/392 |
| 2011/0113489 A1* | 5/2011 | Nakhre | H04L 63/1458 726/22 |
| 2013/0086383 A1* | 4/2013 | Galvao de Andrade | G06F 21/57 713/171 |
| 2013/0152187 A1* | 6/2013 | Strebe | H04L 63/101 726/11 |
| 2014/0283030 A1* | 9/2014 | Moore | H04L 63/0236 726/22 |

OTHER PUBLICATIONS

Web article: "Network ACLs" published by Amazon, 2014 [online][retrieved on Jan. 14, 2014] retrieved from: http://docs.aws.amazon.com/AmazonVPC/latest/UserGuide/VPC_ACLs,html, 7 pps.

Web article: "Access Control List", published by Wikipedia, 2014, [online][retrieved on Jan. 14, 2014] retrieved from: http://en.wikipedia.org/wiki/Access_control_list , 4 pps.

* cited by examiner

DYNAMICALLY DEPLOYING A NETWORK TRAFFIC FILTER

BACKGROUND

Network attacks on computer networks and network-based services have become commonplace. These network attacks may be active attacks that attempt to affect the network's operation or passive attacks that attempt to obtain information from the network. There are many different types of network attacks, such as eavesdropping attacks, spoofing attacks, password-based attacks, Denial-of-Service (DoS) attacks, Man-in-the-Middle attacks and the like. Some network attacks, such as a DoS attack, are designed to disrupt or disable a network by flooding the network with large amounts of useless traffic. A successful DoS attack on a network may disable all or a portion of the network. For example, a network may become unreachable, the network may be slow to respond, a website may not be able to be reached and the like.

Defending against these network attacks can be very challenging. For example, network operators may include different types of security measures, such as deploying one or more firewalls to help prevent unauthorized traffic from entering a network. Network administrators may also create security policies, such as network Access Control Lists (ACLs), which may specify the network traffic that is authorized to flow through a point in the network. Managing these security measures for a large network-based service that includes a large number of computing resources presents even more challenges. For example, managing all of the different firewalls, routers, switches, network traffic rules that may be included in a large network is extremely difficult.

The disclosure made herein is presented with respect to these and other considerations.

DETAILED DESCRIPTION

Figure 1:
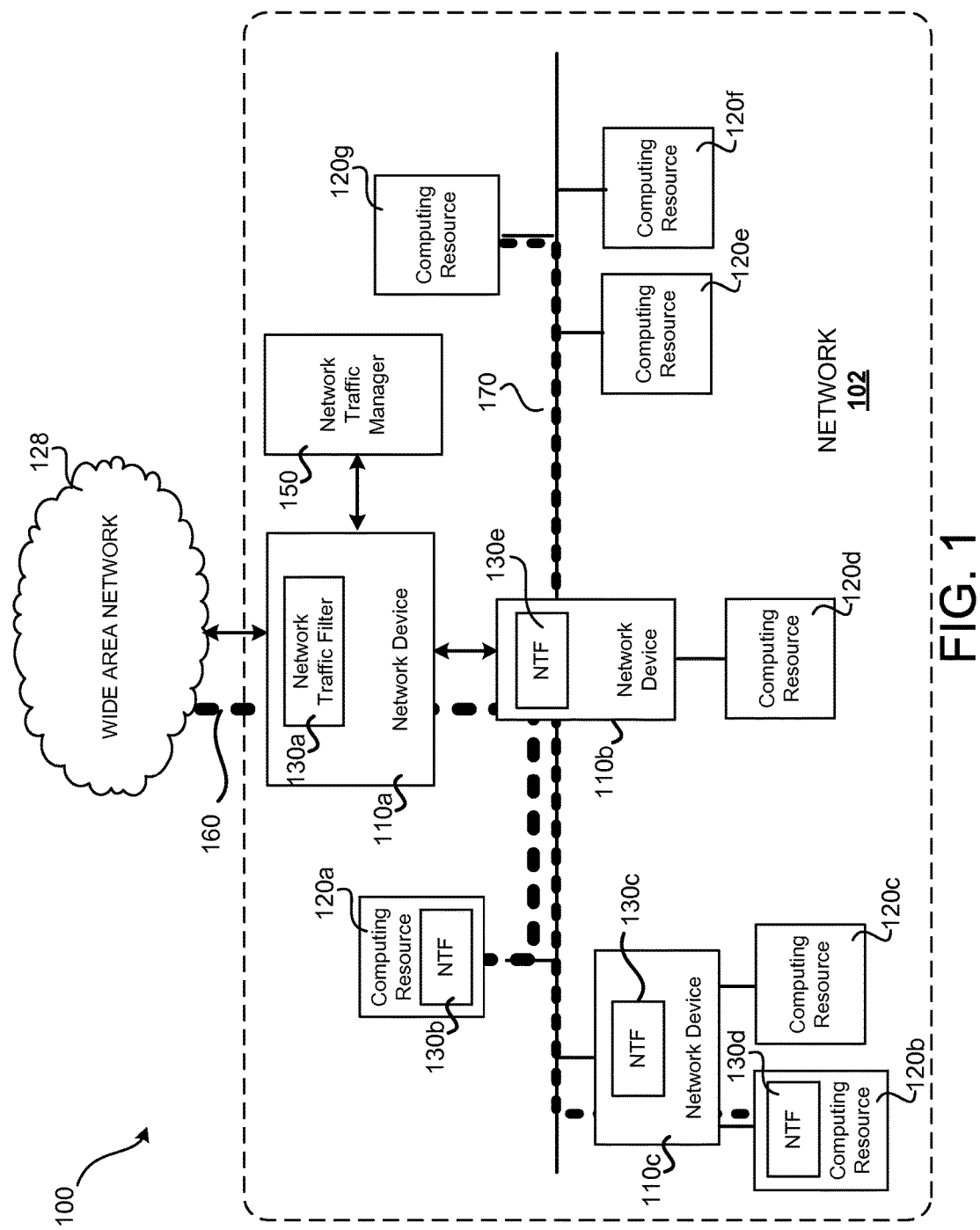
FIG. 1 is a network architecture diagram showing aspects of one illustrative mechanism described herein for dynamically deploying one or more network traffic filters in response to detecting attack traffic flowing within the network.

The following detailed description is directed to technologies for dynamically deploying a network traffic filter in a network. Utilizing the technologies described herein, a network traffic filter is dynamically deployed closer (e.g., upstream) to an entry point of attack traffic such that the attack traffic is filtered before it reaches downstream computing resources. As used herein, the term "upstream" refers to a location in the network that is closer to the entry point of the attack traffic and the term "downstream" refers to a location in the network that is farther from the entry point of the attack traffic. Generally, a network traffic filter applies rules that define what network traffic is allowed to pass through the network traffic filter. For example, the rules applied by a network traffic filter may authorize network traffic to defined network addresses and reject other types of network traffic. A network traffic filter may keep state information (e.g., such as a firewall) or may be stateless (e.g., such as using a network Access Control List (ACL)).

When an attack on a network starts, attack traffic begins to flow from an entry point to one or more locations within the network. For example, the attack traffic may be flowing toward a network traffic filter that is configured to perform network traffic filtering for one or more computing resource in the network. The attack may be detected using different methods. For example, a computing resource that is in the path of the attack traffic may detect the attack by noticing the increase in network traffic (e.g., attack traffic) and/or a computing resource that is configured to monitor network traffic may detect the attack. A message indicating the attack may be sent to a network traffic manager by one or more computing resources that detect the attack.

After detecting the attack, an entry point of the attack may be determined. For example, a determination may be made as to whether the attack traffic originates from outside of the network and/or from a location that is within the network. A location in the network of where to deploy the upstream network traffic filter is also determined. The location in the network is selected such that the attack traffic is filtered by the upstream network traffic filter closer to the entry point of the attack traffic as compared to the location of the network traffic filter. Generally, the location of where to deploy the upstream network traffic filter is selected such that the upstream network traffic filter is capable of performing the filtering of the attack traffic at the selected location without getting overwhelmed by the attack traffic.

The dynamically deployed upstream network traffic filter may include all or a portion of the rules that are applied by the network traffic filter when performing the network traffic filtering. For example, the upstream network traffic filter may include a copy of the rules (e.g., one or more ACLs or other rules) specified by the network traffic filter.

When the attack ends (e.g., the flow of the attack traffic ends), the upstream network traffic filter that was dynamically deployed may be dynamically removed or disabled. For example, the rules that were included in the upstream network traffic filter that were determined from the network traffic filter may be disabled. Through these mechanisms, and potentially others, a dynamically deployed network traffic filter can filter network traffic closer to an entry point of the attack traffic while attack traffic is flowing through the network.

The dynamic deployment mechanism might also be integrated with a service provider operated network-based distributed computing environment (which may be referred to herein as a "service provider network") in assist in protecting computing resources when attacked. Such a service provider network allows customers to purchase and utilize computing resources, such as virtual machine instances, data storage resources, database resources, network-accessible services, networking resources and other types of computing resources on a permanent or as-needed basis. Additional details regarding the various components and processes described above for dynamically deploying a network traffic filter in a network in response to detecting that attack traffic is flowing toward one or more computing resources will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram 100 showing aspects of one illustrative mechanism described herein for dynamically deploying one or more network traffic filters in response to detecting attack traffic flowing within the network. The various mechanisms disclosed herein may operate within many different types of networks and sizes of networks. For example, network 102 may be a small client network that includes only a few computing resources, network 102 may be a service provider network that includes thousands of computing resources, or network 102 may be some other size of network. Some portions of network 102 may have a higher bandwidth as compared to other portions of network 102. For example, the bandwidth of network 102 may be larger near the edge of network 102 (e.g., near network device 110a) and the bandwidth may be smaller farther from the edge of the network.

As shown in FIG. 1, network 102 includes network devices 110a-110c, computing resources 120a-120g, network traffic filters (NTFs) 130a-130e and network traffic manager 150. Computing resources may include different types of resources, such as, but not limited to data processing resources, data storage resources, database resources, networking resources and other types of computing resources. The networking devices 110a-110c might include network components such as network switches, network routers, network firewalls and other types of network components that are configured to perform network filtering operations.

One or more network traffic filters may be deployed in network 102. In the current example, each network device 110 illustrated in network 102 includes a network traffic filter 130. As briefly discussed, a network traffic filter 130, such as network traffic filter 130a, applies one or more rules that determine what network traffic is authorized to pass through the network traffic filter 130.

For example, a network traffic filter 130 may apply a rule that specifies that network traffic that is directed to port 80 is authorized to flow through the network traffic filter 130. Another rule might specify that network traffic that is directed to one or more network addresses is authorized. Generally, a rule that is applied by a network traffic filter 130 may be any rule that specifies what network traffic is authorized and/or what network traffic is not authorized. A network traffic filter 130 may keep state information (e.g., such as a firewall) or may be stateless (e.g., such as using a network Access Control List (ACL)).

A firewall may be configured to examine each network packet in a flow of network traffic to determine whether to forward the packet to its destination. Typically, a firewall maintains state information by identifying the sender of network traffic. For example, a computing resource that is located behind a firewall may send a packet to a public server. A network traffic rule is created when packet leaves the firewall such that the response from the public server may traverse the firewall and return to the client. The firewall uses this state information to allow authorized responses to pass through to the computing resource while dropping unsolicited packets. A firewall may be located at one or more points in the network. For example, one or more of network traffic filters (NTF) 130a-130e may be configured to operate as a firewall.

Generally, an ACL includes rules that define what network traffic is authorized to flow through a device. A network ACL may be applied by a dedicated network device, such as network devices 110a-110c, or by a general computing device, such as computing resources 120a-120f. When a packet reaches a computing device where an ACL is applied, such as a router, switch, or a firewall, the packet is examined to determine if it matches any of the defined ACLs. When a match is discovered, the packet is processed according to one or more actions. For example, packets matching a particular ACL may be denied to pass through the computing device. The packets may be incoming packets into a computing device or outgoing packets from the computing device. ACLs may be applied at various locations within the network.

According to embodiments, network traffic filters 130a-130e may be configured to perform network traffic filtering using rules that are associated with a firewall, an ACL and/or some other network security policy. A network traffic filter 130 may be deployed within a firewall, a router, a switch or some other computing resource that is configured to perform filtering on received network traffic.

A computing resource may or may not be protected with a network traffic filter within the network. According to an embodiment, at least one network traffic filter is deployed in the network and is configured to perform network traffic filtering for a computing resource. In some examples, more than one network traffic filter is deployed between the "edge" of network 102 and the computing resources within a network. For example, three network traffic filters (network traffic filter 130a, network traffic filter 130e and network traffic filter 130b) are illustrated in network 102 as being deployed from the edge of network 102 to computing resource 120a.

Different network traffic filters 130 may have different capabilities. For example, network traffic filter 130a that is associated with network device 110a may have greater processing power as compared to network traffic filter 130d that is associated with computing resource 120b. Similarly, network traffic filter 130e that is associated with network device 110b may have capabilities that are between network traffic filter 130a and network traffic filter 130d. Other network traffic filters 130 may have other capabilities.

FIG. 1 shows two non-limiting examples illustrating dynamically deploying an upstream network traffic manager closer to an entry point of attack traffic. In the first example, attack traffic 160 (represented by a thick dashed line in FIG. 1) enters network 102 from WAN 128 and flows through network device 110a, network device 110b and flows to computing resource 120a that includes network traffic filter 130b. While network traffic filter 130b is shown as a part of computing resource 120a, all or a portion of network traffic filter 130b may be located in a different computing resource. For example, network traffic filter 130b may be implemented as a firewall, a switch or a router that is positioned within the network to receive attack traffic 160 before reaching computing resource 120a.

Attack traffic 160 may cause the network traffic filter 130b to become unresponsive or crash for a variety of different reasons. For example, attack traffic 160 may overload network traffic filter 130b's processing, network interface, or exhaust its memory leading to a DoS at network traffic filter 130b instead of computing resource 120a being protected by network traffic filter 130b.

When attack traffic 160 is detected, an upstream network traffic filter is dynamically deployed at a location in network 102 that is closer to the entry point of attack traffic as compared to the downstream location of network traffic filter 130b. The attack traffic may be detected using different methods. For example, in some cases when not overwhelmed by the attack, network traffic filter 130b and/or computing resource 120a (or some other computing resource) may send a message to another computing device, such as network traffic manager 150, indicating that it is experiencing a network attack.

According to another embodiment, network traffic manager 150, or some other computing device, may detect an attack by monitoring the flow of network traffic within the network. For example, network traffic manager 150 may be configured to detect when the network traffic exceeds a predetermined threshold. Different thresholds may be used depending on the location of the network and/or on the computing resource or computing resources receiving the network traffic. For example, the threshold value near the edge of the network may be set higher as compared to a threshold value deeper within the network.

In response to detecting the attack, network traffic manager 150, or some other computing resource or computing resources, dynamically deploys an upstream network traffic filter. The upstream network traffic filter includes and is configured to apply at least a portion of the rules that are specified by network traffic filter 130b. The upstream network traffic filter may include a copy of the rules that are used by network traffic filter 130b.

The rules may be incorporated into an already deployed network traffic filter or deployed as a new upstream network traffic filter. For example, in response to detecting attack traffic 160, the rules from network traffic filter 130b may be incorporated into network traffic filter 130e. According to an embodiment, network traffic manager 150 selects a location in network 102 to deploy the upstream network traffic filter based on a location of the network that is able to handle the volume of attack traffic that is flowing and that is closer to the entry point of the attack traffic. The determination of where to deploy the upstream network traffic filter may also be based at least in part on a capability of the computing resource where the network traffic filter is deployed. For example, it may be determined that one or more computing resources may not have enough resources (e.g., memory) to deploy the upstream network traffic filter. As used herein, the term "volume" refers to an amount of traffic. Generally, the volume may refer to any countable unit that relates to network traffic. For example, the volume may relate to a number of bytes, a number of packets, a number of TCP SYNs, a number of IP fragments, and the like that are received over a predetermined time period (e.g., one second). A SYN packet refers to a packet that is typically the first packet that is sent by a computing resource when attempting to connect to another computing resource. In some cases the upstream network traffic filter may be deployed at the edge of the network (e.g., at network device 110a) or in other cases when there is a lower volume of attack traffic at network device 110b). In the current example, assume that upstream network traffic filter is deployed on network device 110b.

After the upstream network traffic filter is dynamically deployed, the attack traffic may be filtered using network traffic filter 130e that includes the rules from network traffic filter 130b before the attack traffic is able to reach downstream network traffic filter 130b. When the attack has ended (e.g., as determined by network traffic manager 150 or some other computing resource), the rules from network traffic filter 130b are removed or disabled and are no longer applied by network traffic filter 130e. If a new instance of an upstream network traffic filter is deployed, then the upstream network traffic filter may be automatically removed when the attack ends.

The second example in FIG. 1 illustrates an attack that occurs from within network 102. In the second example, attack traffic 170 (represented by thin dashed lines in FIG. 1) flows from computing resource 120g through network device 110b and network device 110c before flowing to network traffic filter 130d that is filtering network traffic for computing resource 120b. An attack that originates from within network 102 may be handled in a similar manner as an attack that originates from outside of network 102. When an attack is detected (e.g., by network traffic manager 150), one or more computing resources are used to dynamically deploy an upstream network traffic filter that is closer to the entry point of the attack. For example, an upstream network traffic filter may be deployed on computing resource 120g, network device 110b, or network device 110c. In the second example, the rules from network traffic filter 130d may be included in network traffic filter 130*e* or a new upstream network traffic filter may be placed directly on computing resource 120*g* (not shown) in order to stop the attack traffic before it leaves the entry point. When the attack traffic has ended, the upstream network traffic filter may be disabled and/or removed. More details regarding the dynamic deployment of a network traffic filter are described below.

Figure 2:
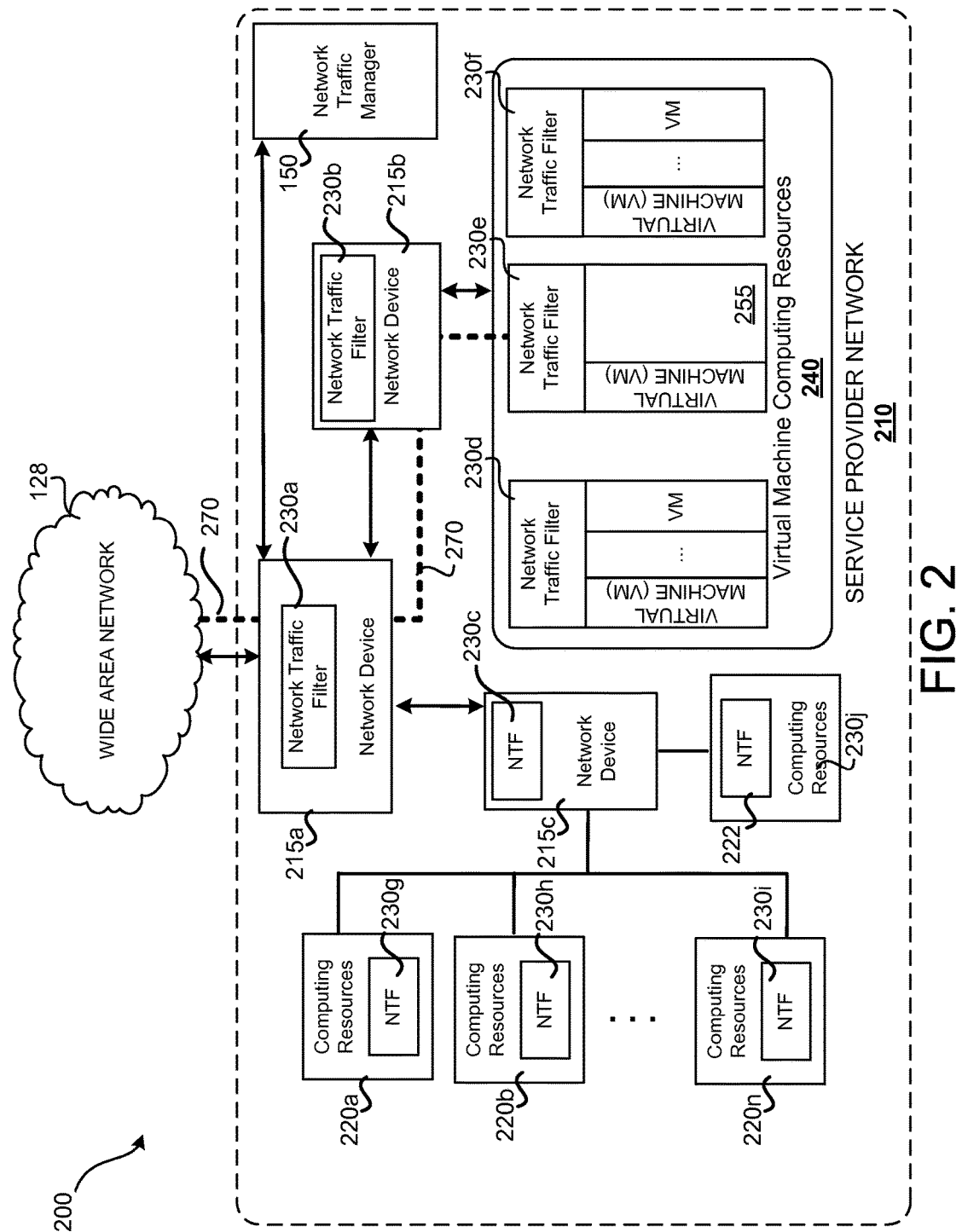
FIG. 2 is a network architecture diagram showing aspects of one illustrative mechanism described herein for dynamically deploying one or more upstream network traffic filters in response to detecting attack traffic flowing within a service provider network.

FIG. 2 is a network architecture diagram showing aspects of one illustrative mechanism described herein for dynamically deploying one or more upstream network traffic filters in response to detecting attack traffic flowing within a service provider network. As illustrated, service provider network 210 is a service provider network in which customers can purchase and utilize computing resources, such as computing resources 220*a*-220*n*, computing resources 222, virtual machine computing resources 240 including virtual machines (VMs) and network devices 215*a*-215*c*. These different resources may be referred to as "resources" or individually as a "resource". As used herein, the term "customer instance" refers to an instance of a computing resource requested by a customer. The resources may include virtual machine instances, networking resources, storage resources, or other types of computing resources, which may be available from a service provider on a permanent or as-needed basis.

Each type or configuration of a resource may be available from the service provider that operates the service provider network 210 in different sizes. For example, a service provider might offer virtual machine computing resources 240 (e.g., VM instances or other types of data processing resources that are available for purchase and use that have many different configurations of processor capabilities, main memory, disk storage and operating system). A service provider might also offer other types of resources, such as computing resources 220*a*-220*n* for purchase and use by customers. For example, a service provider might offer database resources, file or block data storage resources and/or networking resources, such as load balancing resources, domain name service ("DNS") resources, virtual networking resources and/or other types of resources on a permanent or as-needed basis.

The resources may be provided in one particular implementation by one or more data centers operated by the service provider. Data centers are facilities utilized to house and operate computer systems and associated components. Data centers typically include redundant and backup power, communications, cooling and security systems. The data centers may be located in different geographical locations, and may be connected to various other facilities, such as co-location facilities, and various networks (e.g., the Internet), such as WAN 128. In the environment shown in FIG. 2, a service provider might operate one or more data centers configured to provide the resources in the service provider network 210 to its customers. All or a portion of these different networks may be configured for dynamically deploying one or more traffic filters in response to detecting attack traffic. Exemplary details regarding the implementation of a service provider network 210 for providing the functionality disclosed herein is described below with regard to FIGS. 7 and 8.

According to an embodiment, resources are provisioned and de-provisioned as needed in an automated fashion. For example, a customer might submit a request to the service provider network 210 to instantiate a new instance of a computing resource, such as an instance of a virtual machine from virtual machine computing resources 240. In response to receiving such a request, a provisioning component (not shown in FIG. 2), or one or more other components within the service provider network 210, might create the new instance of the virtual machine as requested by the customer. The customer may then be permitted to utilize the new instance of the virtual machine as desired. Other types of computing resources might be instantiated in a similar fashion.

When a customer has finished using a computing resource, such as a virtual machine instance, the customer may request that the resource be de-provisioned. In response thereto, the provisioning component, or another component in the service provider network 210, may cause the computing resources to be de-provisioned. Other types of computing resources might also be provisioned and de-provisioned in a similar manner.

As illustrated, the computing resources in service provider network 210 are located behind one or more network traffic filters, such as network traffic filters (NTF) 230*a*-230*j*. The network traffic filters 230*a*-230*j* may be deployed in one or more configurations. For example, network traffic filters may be deployed as a firewall, a router, a switch or some other configuration that is configured to perform filtering on received network traffic. Each network traffic filter may include rules that specify what network traffic is authorized to pass through the network traffic filter. As discussed above, the rules may be stateful or stateless. For example, one or more of the network traffic filters may be configured using network ACLs that include the network filtering rules.

FIG. 2 illustrates an example of a network attack that shows attack traffic 270 originating outside of service provider network 210 and flowing through network device 215*a*, network device 215*b* and reaching server 255 that includes network traffic filter 230*e* and one or more VMs. As discussed above, attack traffic 270 (represented by a thin dashed line in FIG. 2) may be detected by one or more different computing resources that are associated with a network, such as service provider network 210. For example, network traffic manager 150 may detect the attack traffic 270 flowing toward network traffic filter 230*e*, or one or more other computing resources may detect the attack traffic and send a message to network traffic manager 150 indicating that a network attack is occurring. In response to detecting the attack traffic 270, an upstream network traffic filter may be dynamically deployed to include the network traffic rules that are applied by network traffic filter 230*e* at a location that is closer to the entry point of attack traffic 270. As discussed herein, different upstream locations may be selected for deploying an upstream network traffic filter.

In the current example, network traffic manager 150 determines the locations in service provider network 210 that have the capability to filter attack traffic 270. For example, network traffic manager 150 determines if the available upstream locations in service provider network 210 have the available bandwidth, processing power and memory to handle the filtering of the attack traffic at the available upstream location. According to an embodiment, upstream locations in the network that are closer to an edge of the network near WAN 128 may have high bandwidth and high speed network devices that are capable of performing network traffic filtering on a large volume of attack traffic. In the current example, upstream network traffic filter 230*b* is dynamically deployed to include the rules as specified by network traffic filter 230*e*. Once the attack traffic ends, the upstream network traffic filter 230*b* is removed or the rules that were based on rules from network traffic filter 230*e* are removed or disabled.

It should be appreciated that the configuration for a service provider network as shown in FIG. 2 has been simplified for discussion purposes. A service provider network might include many more hardware and software components than illustrated in FIG. 2 and described above. Additionally, the service provider network 210 might include many other components, such as networks, networking components, data stores and other components than those specifically identified herein.

Figure 3:
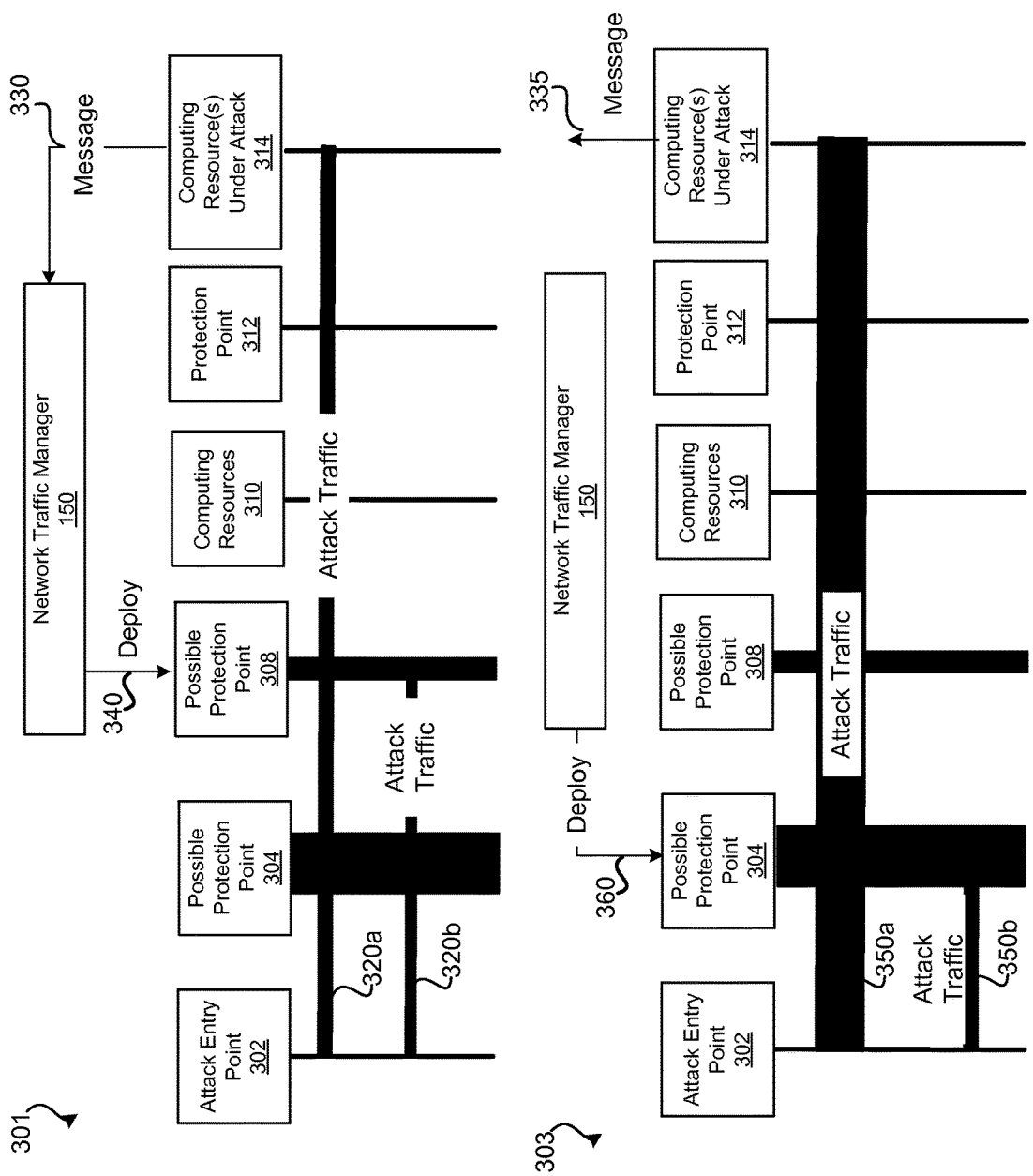
FIG. 3 illustrates example flows showing attack traffic and dynamically deploying an upstream network traffic filter.

FIG. 3 illustrates example flows showing attack traffic and dynamically deploying an upstream network traffic filter. As illustrated, example flow 301 and example flow 303 each show attack entry point 302, possible protection point 304, network traffic manager 150, possible protection point 308, computing resources 310, protection point 312 and computing resource(s) under attack 314. The examples described are for illustrative purposes and are not intended to be limiting. In the current examples, the relative heights of the horizontal bars indicate a size of the traffic and the relative widths of the horizontal bars indicate an available bandwidth at different points in the network.

Example flow 301 illustrates an example attack where the computing resource under attack is still able to send a message that an attack is occurring. In some cases, attack traffic 320a may disrupt the operation of computing resources that are under attack. Example flow 301 shows an attack originating at attack entry point 302 and attack traffic 320a flowing toward protection point 312 that is performing network traffic filtering for computing resource(s) under attack 314. In response to detecting the attack traffic, message 330 is sent to network traffic manager 150. In response to receiving message 330, network traffic manager 150 determines a location of where to deploy an upstream network traffic filter (as described herein) and deploys the upstream network traffic filter as indicated by message 340.

Looking at the bandwidth at possible protection point 308 it can be seen that the bandwidth is large enough to handle the attack traffic 320a. After dynamically deploying the upstream traffic filter at possible protection point 308, the attack traffic 320b is shown as being stopped before flowing through the possible protection point 308. When the attack traffic ends, the dynamically deployed upstream network traffic filter may be removed or disabled as discussed herein.

Example flow 303 illustrates an example attack where the computing resource under attack is not able to communicate with network traffic manager 150 that an attack is occurring. Example flow 303 shows an attack originating at attack entry point 302 and attack traffic 320a flowing toward protection point 312 that is performing network traffic filtering for computing resource(s) under attack 314.

In response to detecting the attack traffic, computing resource(s) under attack 314 attempt to send a message 335 to network traffic manager 150. In the current example, however, message 335 does not reach its destination as protection point 312 is experiencing a DoS condition.

In example flow 303, network traffic manager 150 detects attack traffic 350a, determines a location of where to deploy an upstream network traffic filter (as described herein) and dynamically deploys the upstream network traffic filter as indicated by message 360. Looking at the bandwidth at possible protection point 308 it can be seen that the bandwidth is too small to handle attack traffic 350a. The bandwidth at possible protection point 304, however, is large enough to handle attack traffic 350a. After deploying the upstream traffic filter at possible protection point 304, the attack traffic 350b is shown as being stopped before flowing through the possible protection point 304. When the attack traffic ends, the dynamically deployed upstream network traffic filter may be removed or disabled as discussed herein.

Figure 4:
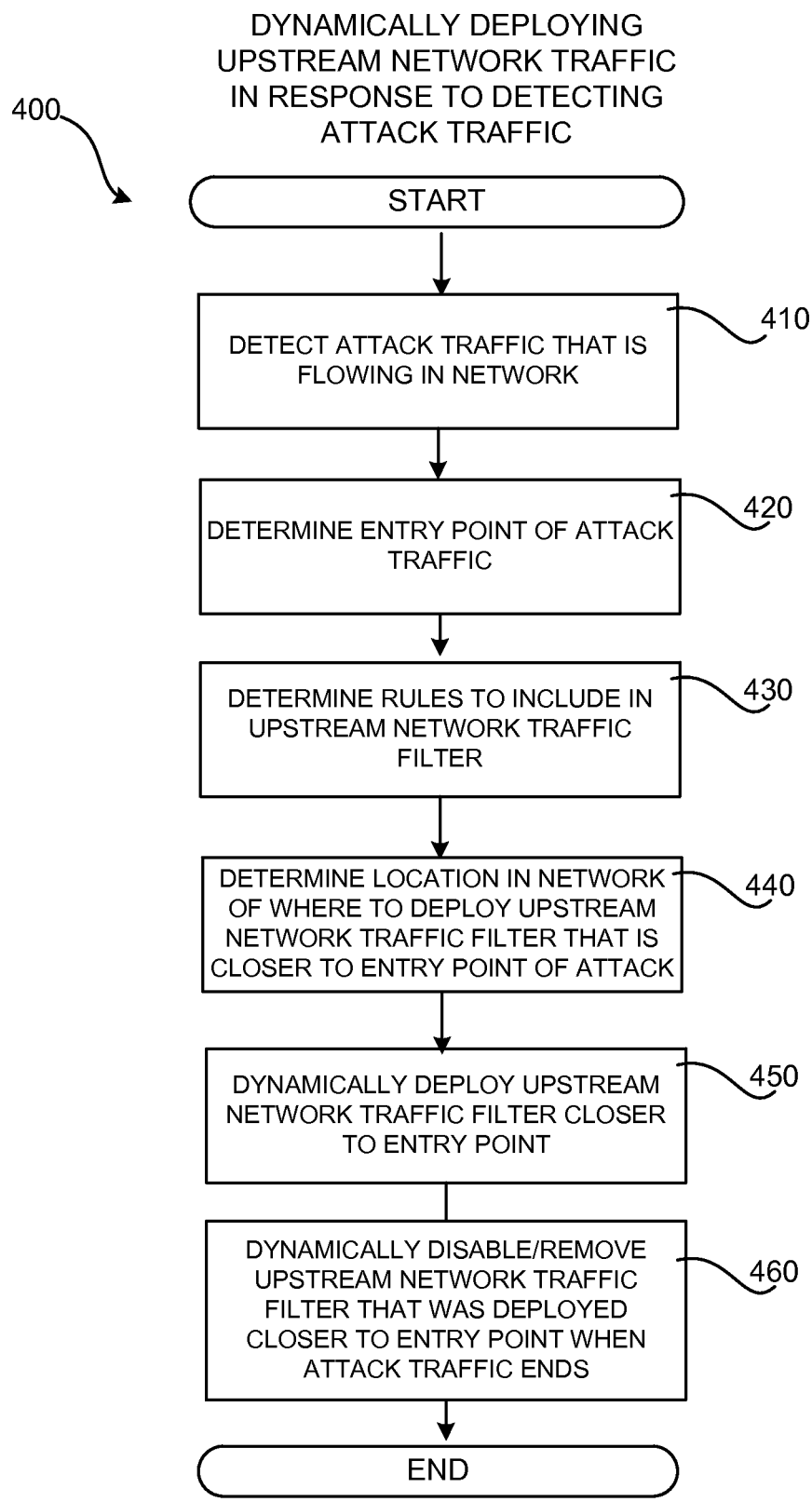
FIG. 4 illustrates a routine for dynamically deploying an upstream network traffic filter in response to detecting attack traffic.
Figure 5:
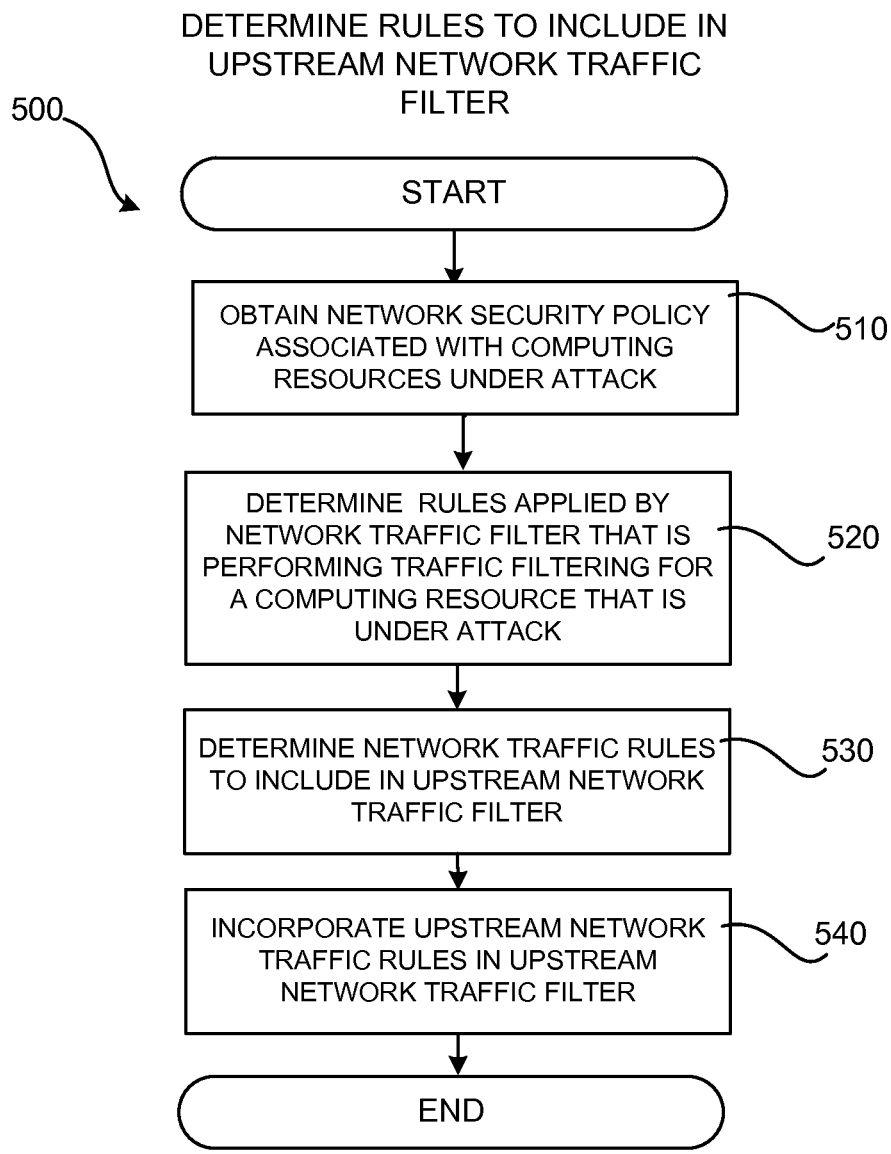
FIG. 5 shows a routine that illustrates determining rules to include in an upstream network traffic filter.
Figure 6:
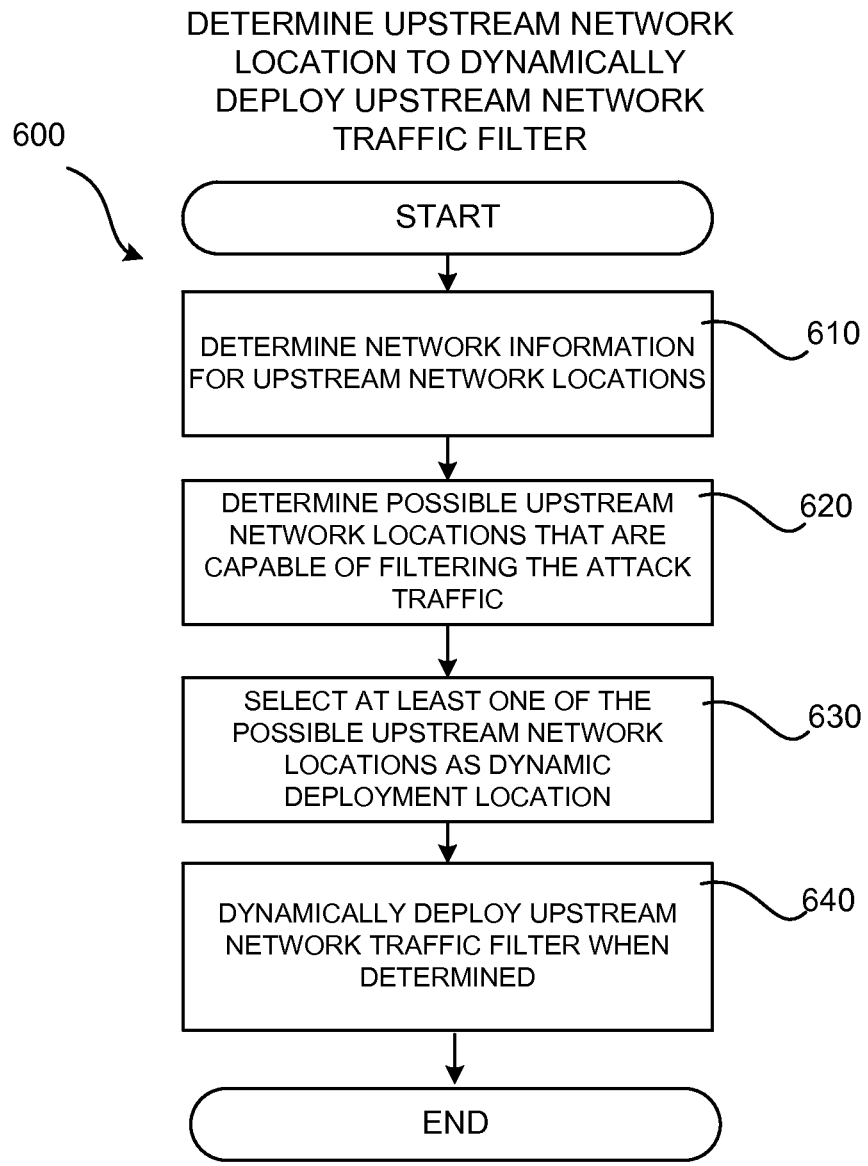
FIG. 6 illustrates a routine for determining an upstream network location to dynamically deploy an upstream network traffic filter.

FIGS. 4-6 are flow diagrams showing routines that illustrate aspects of dynamically deploying traffic filtering at an upstream network location, according to one embodiment disclosed herein. It should be appreciated that the logical operations described herein with respect to FIGS. 4-6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 4 illustrates a routine for dynamically deploying an upstream network traffic filter in response to detecting attack traffic. Routine 400 begins at operation 410, where attack traffic that is flowing in a network is detected. As discussed above, different determinations may be made as to whether attack traffic is flowing in a network. For example, a network traffic manager (as described herein), or some other computing resource, may monitor the network traffic within the network and detect the attack traffic.

According to an embodiment, attack traffic is detected by determining that the volume of network traffic that is flowing past a point in the network exceeds a threshold within a predetermined time period. For example, attack traffic may be detected in response to determining that the number of packets flowing through a network device within a ten second period exceeds the threshold. One or more thresholds may be used to detect when the network traffic that is flowing in the network is attack traffic. For example, the threshold may be a larger value near the edge of the network where the bandwidth for the network may be higher and a lower value in other portions of the network that may have lower a bandwidth.

In addition to detecting the attack traffic by monitoring the network traffic, the attack traffic may be detected by one or more computing resources in the network. In some examples, a computing resource that is under attack traffic may detect the attack traffic and send a message indicating the attack traffic and/or perform some other action in response to detecting the attack traffic. Other mechanisms might also be utilized to detect attack traffic.

From operation 410, routine 400 proceeds to operation 420, where an entry point of the attack traffic is determined. As discussed, the attack traffic may originate from outside of the network and/or from within the network. According to an embodiment, the entry point of the attack traffic indicates a location of where the attack traffic enters the network or a location within the network where the attack traffic is originating. In some cases, the attack traffic may originate from multiple locations.

From operation 420, routine 400 proceeds to operation 430, where the rules to include in an upstream network traffic filter are determined. More details regarding determining the rules to include in upstream network traffic filter are described below with regard to FIG. 5. According to an embodiment, the rules that are included in the upstream network traffic filter are the rules that are specified for use in a network traffic filter that is associated with the computing resource that is under attack. According to other embodiments, a portion of the rules that are specified for use by the network traffic filter may be used.

In some examples, the rules that are determined to include in the upstream network traffic filter may be a copy of the rules that are applied by the network traffic filter that is under attack. For example, the ACL(s) that are applied by the network traffic filter may be copied and included in the upstream network traffic filter. In other examples, the rules may be based on a security policy. For example, a user (e.g., an administrator and/or a user of the network) may have configured a security policy specifying that traffic directed at port 80 is authorized but other traffic should be rejected.

From operation 430, routine 400 proceeds to operation 440, where a location in the network to deploy the upstream network traffic filter is determined. As discussed above, the location of where to deploy the upstream network traffic filter is based on a location in the network that is closer to the entry point.

In addition, the location may also be based at least in part on the network capabilities (e.g., processing, bandwidth) at the available possible locations in the network that are closer to the entry point of the attack traffic as well as the available resources (e.g., memory) of the computing resource at the available possible locations. For example, some network locations may have higher bandwidth and greater processing capabilities and available memory as compared to other locations in the network that are upstream from the network traffic filter.

According to an embodiment, the location is determined by selecting one of the possible network locations that is closer to the entry point and that has the capability to filter the attack traffic that is flowing in the network. Other selections of where to deploy the upstream network traffic filter may be determined. For example, the network location that is closest to the entry point of the attack traffic may be automatically selected. For example, when the attack traffic originates from outside of the network, the network location of where to deploy the upstream traffic filter may be a network device that is located at an edge of the network. More details regarding determining the rules to include in upstream network traffic filter are described with regard to FIG. 6.

From operation 440, routine 400 proceeds to operation 450, where the upstream traffic filter is dynamically deployed. As discussed above, the upstream traffic filter is deployed closer to the entry point of the attack traffic. The upstream traffic filter may be deployed in a variety of ways. For example, an ACL may be deployed for use by a network traffic filter at a network device, firewall rules may be deployed and the like.

From operation 450, routine 400 proceeds to operation 460, where the upstream network traffic filter is removed or disabled when the attack traffic ends. As discussed above, the upstream network traffic filter may be configured to remove or disable the rules that were dynamically deployed. The upstream network traffic filter may be removed or disabled automatically or manually. For example, a network traffic manager may automatically remove the upstream network device or disable the rules that were dynamically deployed in response to determining that the flow of attack traffic in the network has ended. The removal or disabling of the upstream network traffic device may be delayed for some period of time after the attack traffic has ended. For example, the upstream network traffic device may be removed or disabled after fifteen minutes (or some other time period) of not detecting the flow of attack traffic. Routine 400 then proceeds to an end operation and returns to processing other operations. For example, from operation 460, routine 400 may proceed back to operation 410.

FIG. 5 shows a routine that illustrates determining rules to include in an upstream network traffic filter. Routine 500 begins at operation 510, where a network security policy that is associated with the computing resource under attack is obtained. The network security policy may be obtained from one or more different sources. For example, the network security policy may be obtained from configuration data that is associated with a user, from one or more ACLs that are used to filter the network traffic that is associated with the user, from firewall settings, or from other sources. Generally, the network security policy may specify what network traffic is authorized and what network traffic is restricted.

From operation 510, routine 500 proceeds to operation 520, where rules that are applied by the network traffic filter that is performing traffic filtering for a computing resource that is under attack are determined. Generally, the rules that are determined are rules that are defined by the network traffic filter that is receiving the attack traffic is configured to perform network traffic filtering for one or more computing resources that are under attack. The network traffic rules may be obtained from one or more different sources. For example, the network traffic rules may be obtained from one or more ACLs that are deployed on a network device, from a firewall, from a policy, or from some other source.

From operation 520, routine 500 proceeds to operation 530, where the network traffic rules to include in the upstream network traffic are determined. All or a portion of the rules determined during operation 510 and operation 520 may be used when determining the rules to include in the upstream network traffic filter. For example, all or a portion of an ACL that is applied the downstream network traffic filter may be included. According to an embodiment, each rule that is applied by the network traffic filter is determined to be included in the upstream network filter.

From operation 530, routine 500 proceeds to operation 540, where the determined network traffic rules are incorporated into the upstream traffic filter. The network traffic rules may be incorporated into another set of rules that are already in use by a deployed network traffic filter or a new set of network traffic rules may be deployed. The network traffic rules that are dynamically deployed with the upstream network traffic filter may be identified such that they may be removed or disabled when the attack traffic ends. Routine 500 then proceeds to an end operation and returns to processing other operations.

FIG. 6 illustrates a routine for determining an upstream network location to dynamically deploy an upstream network traffic filter. Routine 600 begins at operation 610, where network information for upstream network locations are determined. The network information may include a variety of different information. For example, the network information may include an available bandwidth of the network at the network location, the processing capability of the network location, the memory available at the network location and the like.

From operation 610, routine 600 proceeds to operation 620, where a determination is made as to what upstream network locations have the capability to filter the attack traffic. Zero or more upstream network locations may have the capability to filter the attack traffic. In some examples, the closer the possible network location is near the edge of the network, the more likely that the possible network location has the capability to filter the attack traffic. According to an embodiment, the possible upstream network locations that are determined to be capable of filtering the attack traffic are determined to possible upstream network locations.

From operation 620, routine 600 proceeds to operation 630, where at least one of the possible upstream network locations is selected as the location for the dynamic deployment of the upstream network traffic filter. The selection of the location may be made using different methods. For example, the network location that is closest upstream to the network traffic filter that is under attack and that is capable of filtering the attack traffic may be selected. As another example, the network location that is closest to the entry point of the attack traffic may be selected. For example, when the attack traffic originates from outside of the network, the upstream network location that is selected may be near the edge of the network. In other examples, two or more network locations may be selected. For example, a portion of the network traffic rules may be deployed at one location and the other portion of the network traffic rules may be deployed at another location.

From operation 630, routine 600 proceeds to operation 640, where the network traffic filter is dynamically deployed and is configured to perform the determined rules at the selected upstream network location when determined. According to an embodiment, one or more other actions may occur before dynamically deploying the network traffic filter. According to another embodiment, the network traffic filter is dynamically deployed in response to determining attack traffic. Routine 600 then proceeds to an end operation and returns to processing other operations.

Figure 7:
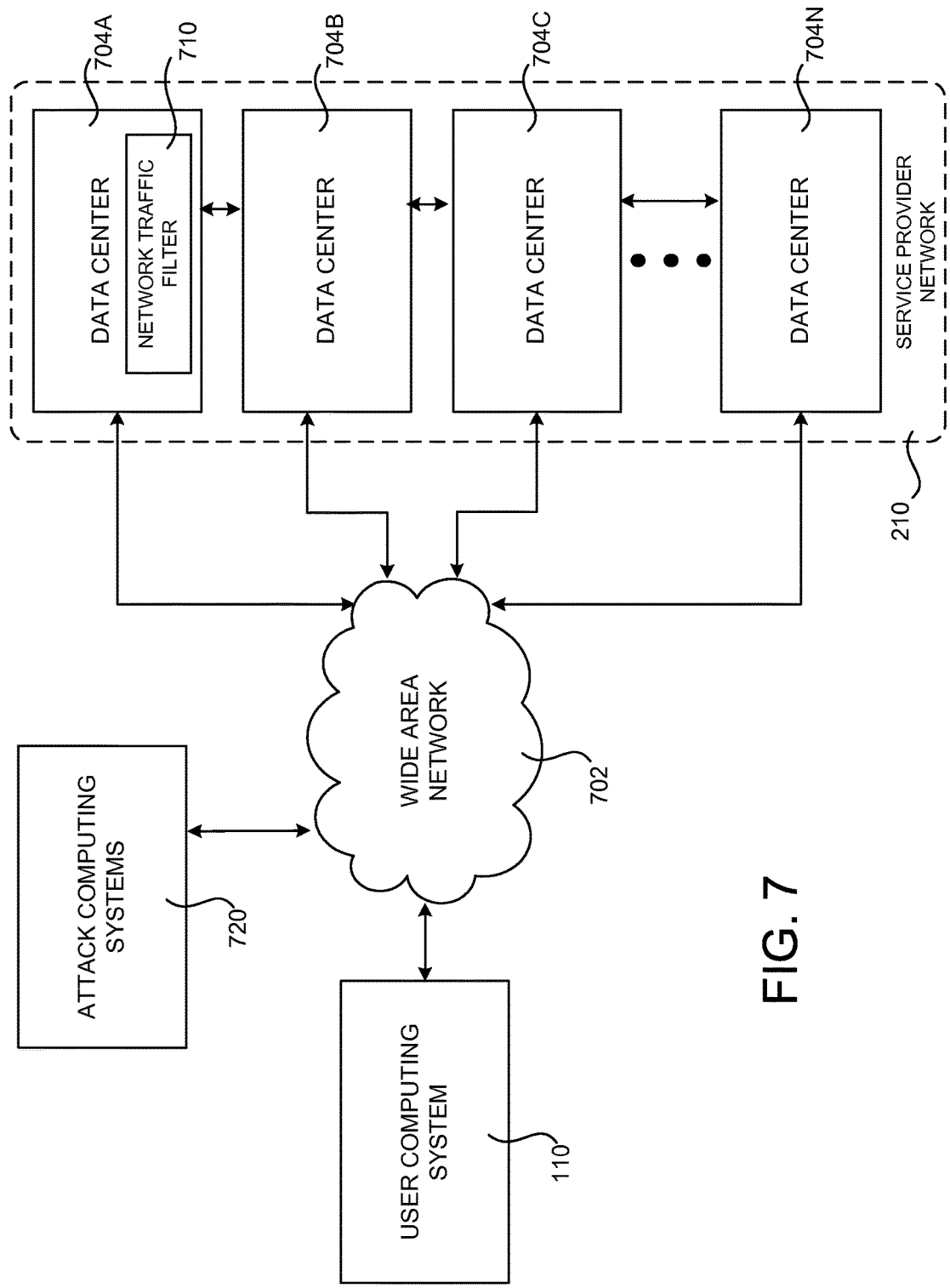
FIG. 7 is a system and network diagram that shows one illustrative operating environment for the embodiments disclosed herein that includes a service provider network.

FIG. 7 and the following description are intended to provide a brief, general description of a suitable computing environment in which the embodiments described herein may be implemented. In particular, FIG. 7 is a system and network diagram that shows an illustrative operating environment that includes a service provider network 210. As discussed above, service provider network 210 can provide instances of computing resources on a permanent or an as-needed basis.

The instances of computing resources provided by the service provider network 210 may include various types of resources, such as data processing resources, data storage resources, networking resources, data communication resources and the like. Each type of computing resource may be general-purpose or may be available in a number of specific configurations. For example, and as will be described in greater detail below, instances of data processing resources may be available as virtual machine instances in a number of different configurations. The virtual machine instances may be configured to execute applications, including Web servers, application servers, media servers, database servers and other types of applications. Instances of data storage resources may include file storage devices, block storage devices and the like. Each type or configuration of an instance of a computing resource may be available in different sizes, such as large resources, consisting of many processors, large amounts of memory, and/or large storage capacity, and small resources consisting of fewer processors, smaller amounts of memory and/or smaller storage capacity.

The instances of computing resources provided by service provider network 210 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein for annotating resources in service provider network 210 will be described below with regard to FIG. 8.

The users and customers of service provider network 210 may access the computing resources provided by the data centers 704 over a suitable data communications network, such as a Wide Area Network ("WAN") 702. Although a WAN 702 is illustrated in FIG. 7, it should be appreciated that a local-area network ("LAN"), the Internet, or any other networking topology known in the art that connects the data centers 704 to the user computing system 110 may be utilized. It should also be appreciated that combinations of such networks might also be utilized.

One or more network traffic filters, such as network traffic filter 710, may be used to filter network traffic within service provider network 210. For example, network traffic filter 710 may be used to filter attack traffic flowing from attack computing systems 720 and flowing toward computing resources in a data center, such as data center 704A.

Figure 8:
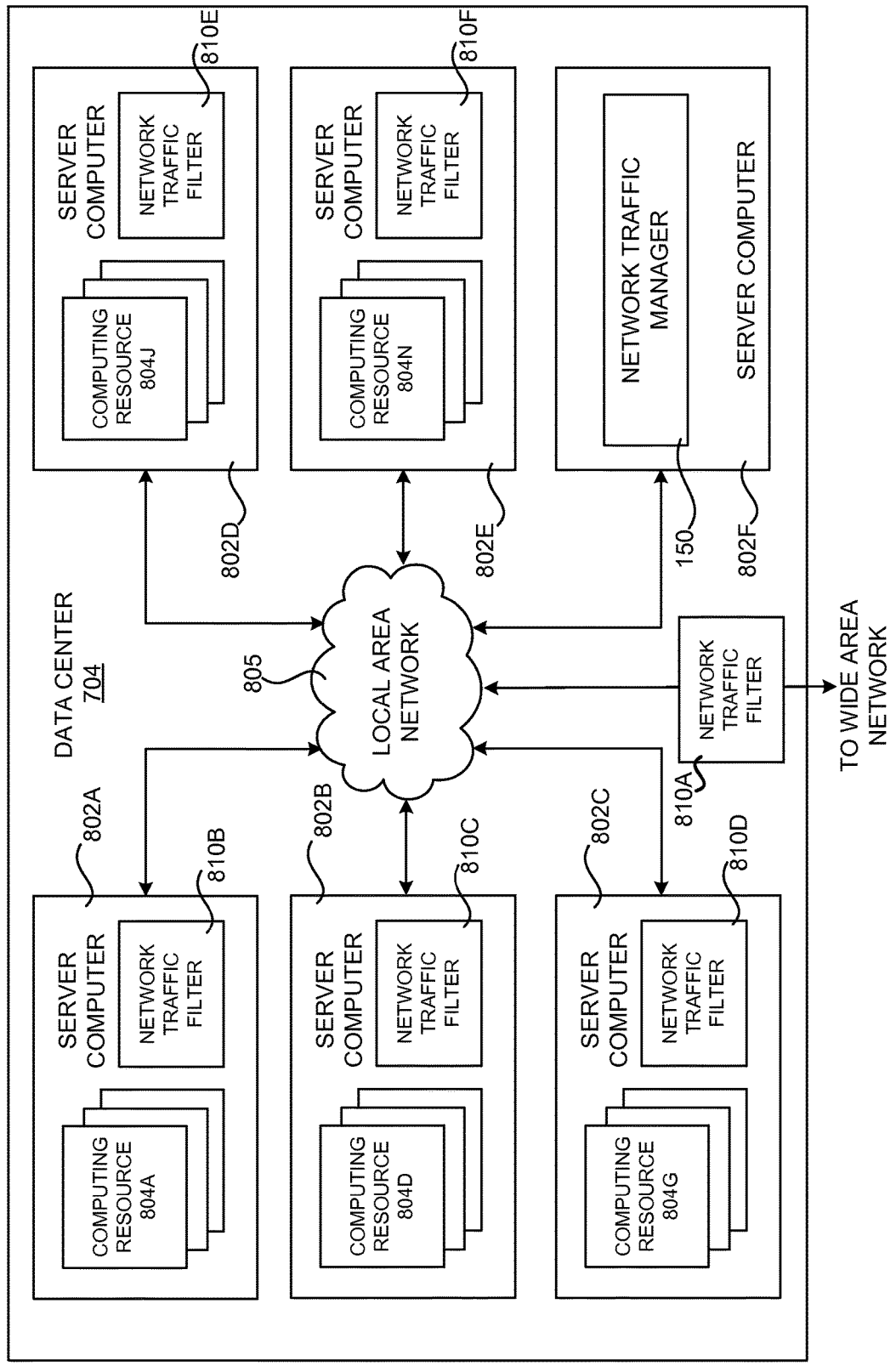
FIG. 8 is a computing system diagram that illustrates one configuration for a data center that implements aspects of the concepts and technologies disclosed herein for dynamically deploying an upstream network traffic filter.

FIG. 8 is a computing system diagram that illustrates one configuration for a data center 704 that implements aspects of a service provider network 210, including some or all of the concepts and technologies disclosed herein for dynamically deploying an upstream network traffic filter. The example data center 704 shown in FIG. 8 includes several server computers 802A-802F (which may be referred to herein singularly as "a server computer 802" or in the plural as "the server computers 802") for providing instances of computing resources. The server computers 802 may be standard tower or rack-mount server computers configured appropriately for providing the computing resources described herein. For example, in one implementation the server computers 802 are configured to provide instances of computing resources 804A-804N.

In one embodiment, some of the instances of computing resources 104A are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing instances of computing resources. In the case of virtual machine instances, for example, the instance manager might be a hypervisor or another type of program configured to enable the execution of multiple virtual machine instances on a single server computer 802, for example.

The example data center 704 shown in FIG. 8 includes network traffic filters 810A-810F (which may be referred to herein singularly as "network traffic filter 810" or in the plural as "network traffic filters 810") for performing network traffic filtering at various network locations.

It should be appreciated that although the embodiments disclosed herein are described primarily in the context of virtual machine instances, other types of instances of computing resources can be utilized with the concepts and technologies disclosed herein. For instance, the technologies disclosed herein might be utilized with instances of hardware resources, instances of data storage resources, instances of data communications resources, instances of networking resources, instances of database resources and with other types of instances of computing resources.

The data center 704 shown in FIG. 8 also includes a server computer 802F reserved for executing software components for managing the operation of the data center 704, the server computers 802, the instances of computing resources 804 and other resources within the service provider network 210. In particular, the server computer 802F might execute the network traffic manager 150. Details regarding the operation of each of these components has been provided above. In this regard, it should be appreciated that while these components are illustrated as executing within service provider network 210, computing systems that are external to service provider network 210 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the WAN 702 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 802A-802F in each data center 704 and between instances of computing resources provided by the service provider network 210.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
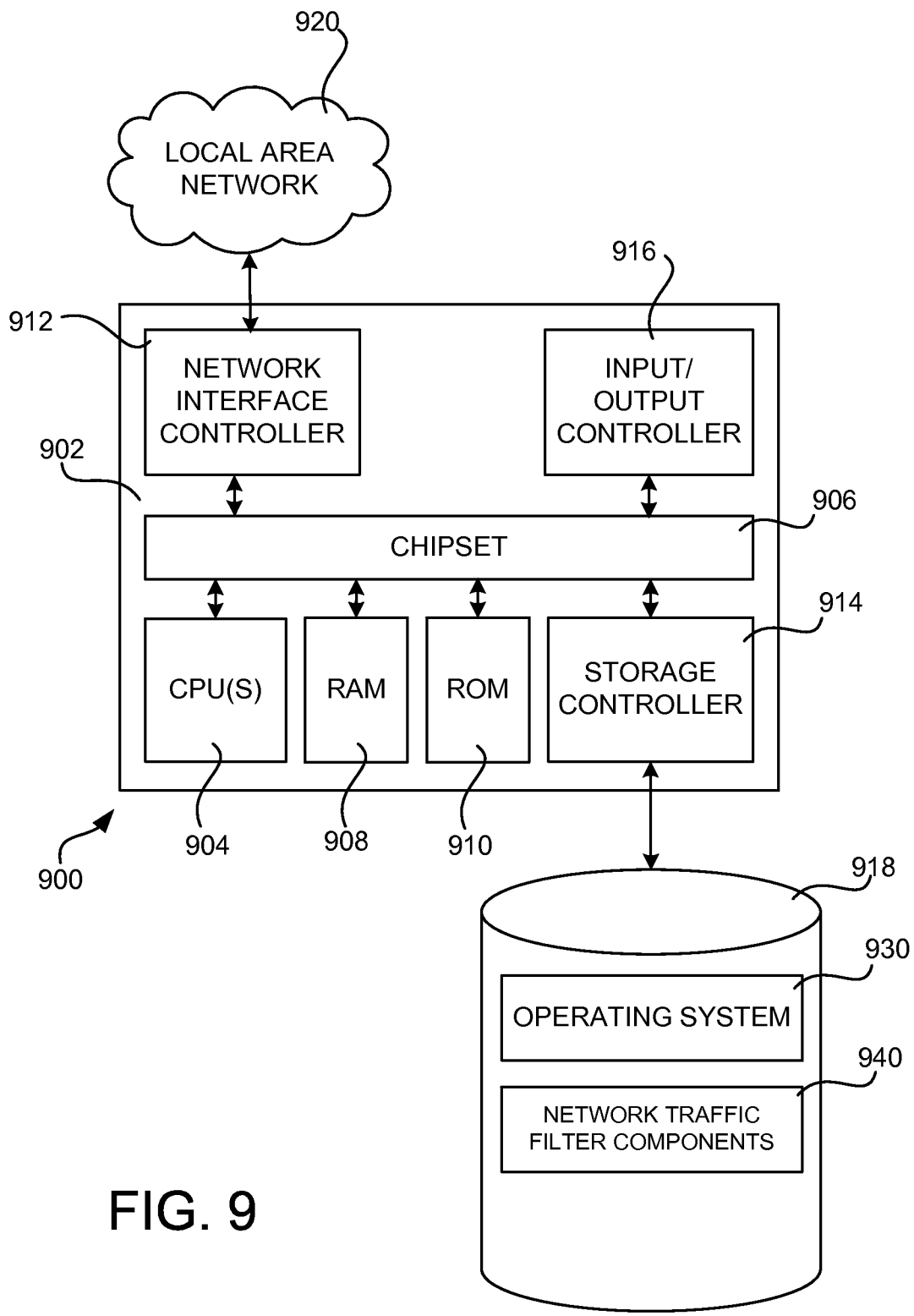
FIG. 9 is a computer architecture diagram showing one illustrative computer hardware architecture for implementing a computing device that might be utilized to implement aspects of the various embodiments presented herein.

FIG. 9 shows an example computer architecture for a computer 900 capable of executing program components relating to dynamically deploying an upstream network traffic filter in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations relating to dynamically deploying an upstream network traffic filter as described above. The computer architecture shown in FIG. 9 might also be utilized to implement a customer computing system or any other of the computing systems described herein.

The computer 900 includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the embodiments described herein.

The computer 900 may operate in a networked environment using logical connections to remote computing devices and computer systems through a network, such as the local area network 920. The chipset 906 may include functionality for providing network connectivity through a NETWORK INTERFACE CONTROLLER (NIC) 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 918 may store other system or application programs and data utilized by the computer 900, such as network traffic filter components 940 and/or any of the other software components and data described above. The mass storage device 918 might also store other programs and data not specifically identified herein.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various routines described above with regard to FIGS. 4-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for dynamically deploying an upstream network traffic filter in a network have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for dynamically deploying network traffic filtering in a network that includes computing resources, the method comprising:

detecting attack traffic that is flowing within the network toward a first computing resource that is running an instance, the detecting the attack traffic comprising receiving a message from at least one of the first computing resource or a second computing resource that indicates an attack is occurring in the network;

determining first rules of a first network traffic filter, wherein the first network traffic filter is associated with the first computing resource and configured to apply the first rules to perform network traffic filtering for the instance running on the first computing resource, wherein the first network traffic filter is at a first location within the network;

in response to detecting the attack traffic, determining an entry point that indicates where the attack traffic is originating;

obtaining a copy of at least a portion of the first rules applied by the first network traffic filter;

determining, based at least in part on the copy of the at least the portion of the first rules, second rules for a second network traffic filter to be placed upstream from the first traffic filter, the second network traffic filter configured to apply the second rules to perform network traffic filtering for the instance;

determining that the second computing resource is at a second location in the network closer to the entry point than the first location;

determining a volume of the attack traffic;

determining at least one of bandwidth, processing power, or memory associated with the second computing resource;

determining that the at least one of the bandwidth, processing power, or memory of the second computing resource is capable of handling the volume of the attack traffic;

determining to deploy the second network traffic filter at the second computing resource based at least in part on the second computing resource being at the second location in the network closer to the entry point than the first location and based at least in part on the at least one of the bandwidth, processing power, or memory of the second computing resource being capable of handling the volume of the attack traffic;
dynamically deploying the second network traffic filter at the second computing resource;
detecting that the attack traffic has ended; and
disabling the second network traffic filter.

2. The computer-implemented method of claim 1, wherein detecting that the attack traffic has ended comprises determining that a volume of the network traffic is below a predetermined threshold.

3. The computer-implemented method of claim 1, wherein detecting the attack traffic that is flowing within the network toward the first computing resource comprises determining that volume of the network traffic exceeds a predetermined threshold.

4. The computer-implemented method of claim 1, wherein determining the second rules for the second network traffic filter comprises determining the second rules from a user configured policy that specifies what network traffic to authorize.

5. The computer-implemented method of claim 1, wherein determining the entry point that indicates where the attack traffic is originating comprises determining at least one of that the entry point is within the network or that the entry point is outside of the network.

6. A system for dynamically deploying a network traffic filter, the system comprising:
a network comprising computing resources;
a first network traffic filter that is configured to filter network traffic for a first computing resource of the computing resources by applying rules, wherein the first computing resource is located at a first location within the network; and
a network traffic manager that is executing on a processor of a second computing resource of the computing resources that is configured to:
detect that attack traffic is flowing toward the first computing resource, the detecting comprising receiving a message from at least one of the first computing resource or a third computing resource that indicates an attack is occurring in the network;
detect a first volume of the attack traffic at a first point in time;
identify the third computing resource of the computing resources at a second location within the network that is upstream from the first location relative to a direction from which the attack traffic is flowing;
identify at least one of a bandwidth, processing power, or memory associated with the third computing resource;
determine that the at least one of the bandwidth, processing power, or memory associated with the third computing resource can handle the first volume of the attack traffic;
based at least in part on determining that the at least one of the bandwidth, processing power, or memory associated with the third computing resource can handle the first volume of the attack traffic, dynamically deploy a second network traffic filter on the third computing resource, wherein the second network traffic filter comprises at least a portion of the rules that are applied by the first network traffic filter;
detect that a second volume of the attack traffic at a second point in time is below a predetermined threshold; and based at least in part on detecting that the second volume of the attack traffic is below the predetermined threshold, disable the second network traffic filter.

7. The system of claim 6, wherein the network traffic manager is further configured to remove the second network traffic filter based at least in part on detecting that the second volume of the attack traffic is below the predetermined threshold.

8. The system of claim 6, wherein detect that the attack traffic is flowing toward the first computing resource comprises determining that an amount of network traffic exceeds a predetermined threshold within a predetermined time period.

9. The system of claim 6, wherein the network traffic manager is further configured to determine that the attack traffic originates from multiple entry points.

10. The system of claim 6, wherein the network traffic manager is configured to determine that the second location in the network is closer to an entry point of the attack traffic based at least in part on a third volume of the attack traffic that is flowing toward the first computing resource.

11. The system of claim 6, wherein the first computing resource comprises a server computing device that includes the first network traffic filter and at least one virtual machine.

12. The system of claim 6, wherein dynamically deploy the second network traffic filter comprises:
determine that an entry point of the attack traffic is at a location that is outside of the network; and
determine that the second location is near an edge of the network.

13. The system of claim 6, wherein deploy the second network traffic filter comprises determining to include the at least the portion of the rules on at least one network device in the network.

14. The system of claim 6, wherein the network traffic manager is further configured to obtain a copy of the rules applied by the first network traffic filter and to include the copy of the rules in the second network traffic filter.

15. One or more non-transitory computer-readable storage media comprising computer-executable instructions stored thereupon which, when executed by one or more processors, cause the one or more processors to:
detect, from within a first part of a network, attack traffic that is flowing toward a first computing resource in a second part of the network, wherein a first network traffic filter, deployed within the first computing resource or a second computing resource at a first location, is configured to perform network traffic filtering for the first computing resource, wherein detecting the attack traffic comprises receiving a message from at least one of the first computing resource or another computing resource that indicates an attack is occurring in the network;
identify first rules applied by the first network traffic filter to perform the network traffic filtering for the first computing resource;
determine an entry point that indicates where the attack traffic is originating;
determine a volume of the attack traffic;
identify a third computing resource at a second location within the network that is closer in the network to the entry point than the first location;
determine that at least one of bandwidth, processing power, or memory associated with the third computing resource is capable of handling the volume of the attack traffic;
determine to deploy a second network traffic filter at the third computing resource based at least in part on the second location being closer in the network to the entry point than the first location and based at least in part on the at least one of the bandwidth, processing power, or memory associated with the third computing resource being capable of handling the volume of the attack traffic;

generate second rules for the second network traffic filter that include at least a portion of rules represented in the first rules;

dynamically deploy the second network traffic filter at the third computing resource that is closer in the network to the entry point such that the attack traffic is filtered by the second network filter before reaching the first network traffic filter;

detect that a volume of the attack traffic is below a predetermined threshold; and disable the second network traffic filter.

16. The one or more non-transitory computer-readable storage media of claim 15, wherein determine the entry point that indicates where the attack traffic is originating comprises determining that the entry point is outside of the network.

17. The one or more non-transitory computer-readable storage media of claim 15, further comprising determining that the attack traffic has ended for a predetermined period of time.

18. The one or more non-transitory computer-readable storage media of claim 15, further comprising to determine a location in the network to dynamically deploy the second network traffic filter that can handle the attack traffic.

* * * * *